UNITED STATES PATENT OFFICE.

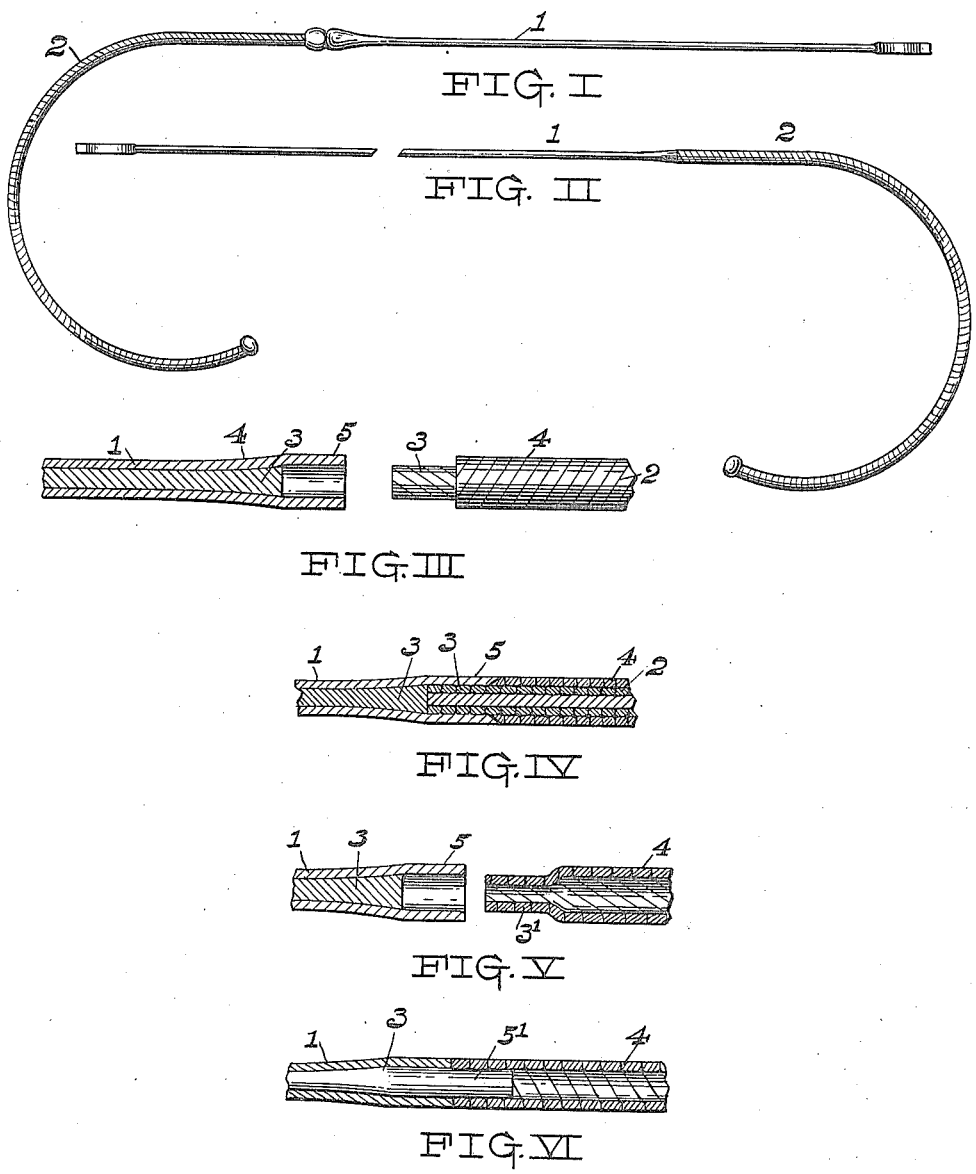

STEPHEN C. LAFLIN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION.

TEMPLE.

1,197,214.

Specification of Letters Patent.

Patented Sept. 5, 1916.

Application filed April 25, 1913. Serial No. 763,485.

*To all whom it may concern:*

Be it known that I, STEPHEN C. LAFLIN, a citizen of the United States, residing at Southbridge, in the county of Worcester and State of Massachusetts, have invented certain new and useful Improvements in Temples, of which the following is a specification.

My invention relates to improvements in temples and has particular reference to that type of temple composed of two parts.

The leading object of my invention is the provision of an improved manner of so uniting the said parts as to form a smooth and durable connection therebetween.

A further object of my invention is to provide an improved connection for the parts of temples of this character which will eliminate the unsightly and uncomfortable butt joint usually present in this construction of temple and which will also render the joint much stronger than ordinarily and prevent undue withdrawal of the temper of the parts during the connection thereof as has hitherto frequently been the case.

Other objects and advantages of my invention should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a side elevation of a prior art construction. Fig. II represents a side elevation of a temple constructed in accordance with and embodying my improvement. Fig. III represents an enlarged view partially in section of the two portions of the temple ready to be joined. Fig. IV represents a fragmentary longitudinal sectional view showing the parts joined. Fig. V represents a fragmentary sectional view of a slightly modified construction. Fig. VI represents a similar view of another modified construction.

In the drawings, the numeral 1 designates the butt section of a temple having attached thereto an ear hook portion 2 which I have illustrated as a cable section although it will be understood that the principle of my invention may be employed in uniting any form of ear hook and butt as desired.

While it will be understood that my invention is applicable to temples formed from any material, I have illustrated the same as used in forming temples of gold filled material, this material being the hardest to work and make up satisfactorily, and my invention being particularly adapted for use with this form of material.

As most clearly shown in Fig. III, the section 1 consists of a base metal portion 3 inclosed by a layer of gold or precious metal, while the cable section 2 is likewise formed of a base portion 3 surrounded by the coiled portion 4 of precious metal. In uniting the two sections it is very desirable that a smooth joint be made in order that there will be nothing present to irritate the face of the wearer, while it is also necessary that the parts be so united that none of the base metal of either will be at all exposed, as should any base metal be exposed the same will tend to discolor the temple. To most satisfactorily attain this result I preferably unwind a portion of the precious metal covering 4 of the temple portion 2, leaving exposed the core 3 thereof, likewise drilling out of the section 1 the base metal core 3, leaving merely the precious metal 4. As will be observed by reference to the drawings, the portion 1 is preferably enlarged at 5 where this drilling occurs in order that it may make a smooth joint with the cable portion 2 which is ordinarily of greater diameter than the mean diameter of the butt or side 1. The parts having been reduced to the state illustrated in Fig. III the core of the ear hook 2 is then inserted into the bore of the side 1 where it may be soldered if desired or may be secured by swaging of the metal 5 down thereupon, this swaging operation causing the metal to flow slightly over the outer portion of the ear hook 2, as clearly illustrated in Fig. IV, this flowing of the portion 5 over the ear hook and this swaging into the core thereof firmly retaining the core in position and uniting the parts in a unitary structure without the necessity of solder or other securing medium and both securing the outer strands of the cable 2 against accidental loosening and also forming a continuous layer of precious metal on the outside of the temple.

In Fig. V I have illustrated a slight modification of my invention in which the cable section is shown and has the terminal portion slightly reduced as shown at 3', to fit into the socketed portion 5 of the side 1.

In Fig. VI, I have illustrated another slight modification in which the cable section remains of constant size, while the side 1 has a reduced portion 5' fitting within the hollow cable, in this instance the cable being swaged or reduced onto the core 5' instead of the portion 5 being reduced onto the core of the ear hook section as in the previously described forms.

I claim:

1. The process of forming an eyeglass temple, consisting in forming a temple side with a base metal core and an incasing gold shell, forming an ear hook from spirally wound strands comprising layers wound in opposite directions, cutting the ear hook section to desired length, removing a portion of the outer spirally found strands at one end of the ear hook section, hollowing out the base metal core from the side section to provide a socket, inserting the tang formed by removing a portion of the ear hook into the socket formed in the temple side, and swaging the parts to cause the walls of the socket to bite into the exposed end of the ear hook, and continuing the swaging operation until the terminal portion of the socket wall will flow over the adjacent portion of the exterior winding of the ear hook to lock the terminus of the outer spirally wound ear hook section against any unwinding movement and make a smooth joint therewith, substantially as illustrated.

2. The process of forming a temple, for an ophthalmic mounting consisting in shaping a temple side section, forming said section with a pivot ear at one end and with a swelled portion at the opposite end, forming a socket in the swelled end, spirally winding a flexible ear hook section, reducing the diameter of the terminal end of the ear hook section to provide a tang of substantially the size of the socket formed in the swelled portion of the temple side, inserting the tang within said socket, and swaging the joint to cause the material of the swelled portion of the socket to bite into the tang and to flow slightly over the joint or shoulder at the terminus of the tang to overlie the end of the spirally wound outer portion of the ear hook to lock the several spiral strands against accidental loosening and make a flush joint therewith.

In testimony whereof I affix my signature in presence of two witnesses.

STEPHEN C. LAFLIN.

Witnesses:
H. K. PARSONS,
FLORENCE E. CODERRE.